US008394883B2

(12) United States Patent
Viola et al.

(10) Patent No.: US 8,394,883 B2
(45) Date of Patent: Mar. 12, 2013

(54) VULCANIZABLE BLEND COMPRISING PARTIALLY HYDROGENATED VINYLARENE-CONJUGATED DIENE BRANCHED POLYMERS

(75) Inventors: Gian Tommaso Viola, Cervia (IT); Luca Soddu, Castel San Pietro Terme (IT); Fabio Bacchelli, Ravenna (IT)

(73) Assignee: Polimeri Europa S.p.A. (IT)

( * ) Notice: Subject to any disclaimer, the term of this patent is extended or adjusted under 35 U.S.C. 154(b) by 625 days.

(21) Appl. No.: 12/593,662

(22) PCT Filed: Mar. 18, 2008

(86) PCT No.: PCT/EP2008/002149
§ 371 (c)(1),
(2), (4) Date: Oct. 26, 2009

(87) PCT Pub. No.: WO2008/119465
PCT Pub. Date: Oct. 9, 2008

(65) Prior Publication Data
US 2010/0130639 A1   May 27, 2010

(30) Foreign Application Priority Data
Mar. 29, 2007   (IT) .............................. MI2007A0626

(51) Int. Cl.
*B60C 11/00* (2006.01)
*B60C 1/00* (2006.01)
*C08K 3/36* (2006.01)
*C08K 3/04* (2006.01)

(52) U.S. Cl. ...................... 524/493; 152/209.1; 524/492; 524/495; 524/496

(58) Field of Classification Search ............... 152/209.1; 523/205, 206; 524/492, 493, 495, 496, 501, 524/847; 526/72, 346
See application file for complete search history.

(56) References Cited

U.S. PATENT DOCUMENTS

| 4,501,857 A | 2/1985 | Kishimoto et al. |
| 4,673,714 A | 6/1987 | Kishimoto et al. |
| 5,804,644 A * | 9/1998 | Nakafutami et al. ......... 524/572 |
| 5,948,869 A | 9/1999 | Vallieri et al. |
| 6,858,683 B2 | 2/2005 | Viola et al. |

FOREIGN PATENT DOCUMENTS

| EP | 0 775 725 A1 | 5/1997 |
| EP | 1 829 906 A1 | 9/1997 |

OTHER PUBLICATIONS

Kolthoff, I.M. et al., "Determination of Polystyrene in GR-S Rubber," *Journal of Polymer Science*, 1946, vol. 1, No. 5, pp. 429-433.
Pattuelli, M.E., et al., "Sequence Distribution of Styrene-Butadiene Copolymers by Ozonolysis, High Performance Liquid Chromatographic and Gas Chromatographic-Mass Spectrometric Techniques," *Journal of Chromatography A*, 1994, vol. 665, pp. 117-123.
Tokita, N. et al., "The Dependence of Processability on Molecular Weight Distribution of Elastomers," *Rubber Chemistry and Technology*, 1973, vol. 46, pp. 1166-1187.
Viola, G.T. et al., "Coupling Reaction of Polyisoprenyllithium with 1,2-Dibromethane," *Journal of Polymer Science: Part A: Polymer Chemistry*, 1997, vol. 35, pp. 17-25.
Technology, W. et al., "Classical Light Scattering from Polymer Solutions," *Polymer Science Library*, 1987, Application Note: Nr. 9, pp. 237-257.

* cited by examiner

*Primary Examiner* — Ling Choi
*Assistant Examiner* — Darcy D Laclair Lynx
(74) *Attorney, Agent, or Firm* — DLA Piper LLP (US)

(57) ABSTRACT

A raw elastomeric composition includes:
(a1) from 30 to 90% by weight of a partially hydrogenated vinylarene-conjugated diene random elastomeric copolymer;
(a2) from 10 to 70% by weight of one or more diene rubbers;
(b) from 10 to 150 phr of silica;
(c) from 0.1 to 20 phr of a coupling agent based on silane;
(d) from 0.1 to 10 phr of a vulcanization agent;
wherein the partially hydrogenated vinylarene-conjugated diene random copolymer has a structure which has nodes statistically distributed in the macromolecule, from which polymeric chains branch out, the bond between the nodes and the branches being a carbon-carbon bond.

17 Claims, No Drawings

VULCANIZABLE BLEND COMPRISING PARTIALLY HYDROGENATED VINYLARENE-CONJUGATED DIENE BRANCHED POLYMERS

RELATED APPLICATION

This is a §371 of International Application No. PCT/EP2008/002149, with an international filing date of Mar. 18, 2008 (WO 2008/119465 A1, published Oct. 9, 2008), which claims priority to Italian Patent Application No. MI2007A000626, filed Mar. 29, 2007.

TECHNICAL FIELD

This disclosure relates to a blend vulcanizable with sulphur, mainly useful for tire treads.

The disclosure relates to a vulcanizable composition comprising partially hydrogenated vinylarene conjugated diene random copolymers, having a structure which has nodes statistically distributed in the macromolecule, from which polymeric chains branch out; the bond between nodes and branches being a carbon-carbon bond.

The disclosure also relates to tire treads which can be obtained through the vulcanization of the above-mentioned composition, said tire treads having enhanced dynamo-mechanic properties, in particular low rolling resistance and a sufficient wet grip.

BACKGROUND

It is known that the behavior of a tire on the road, especially car tires, mainly depends on the composition of the tread blend. Numerous studies are consequently being effected to vary the compositions of the elastomeric polymer, fillers and other additives contained in the tread blend, to find increasingly improved compositions.

It should also be taken into consideration that an improvement in one property of the tire, can lead to a deterioration in other characteristics. It is well known, for example, that an improvement in the performances on a wet surface is normally linked to a deterioration in the rolling resistance.

Normal blends comprising carbon black as reinforcing material have proved to be unsuitable for obtaining a balance between the rolling resistance and wet skid properties.

Better results have been obtained using silica as the prevailing reinforcing material.

Unlike carbon black, however, silica has the disadvantage of a having a poor affinity for the elastomeric material, with consequent problems of processability of the blend due to the low dispersibility of silica in the elastomeric material. A first problem to be solved when using silica is therefore to have a good dispersion of the silica in the rubber. This problem can be solved by using a coupling agent based on silane, modifying the rubber and increasing the affinity of silica for rubber.

EP-A-775725 describes a raw elastomeric composition comprising (i) at least 30 phr (parts by weight referring to 100 parts of the total rubber) of a styrene/partially hydrogenated butadiene copolymer; (ii) silica; (iii) an organosilane as coupling agent. Once vulcanized, this blend produces tire treads with good performance. In the above document, however, the bonds between the macromolecules are not C—C bonds but C-heteroatom (Si, O, Sn) bonds. The hydrogenation conditions used therefore cause a partial degradation of the molecules with a consequent decrease in the Mooney viscosity. This is probably due to the interaction of the C-heteroatom bonds with the alkylating agents (for example Al-alkyls, Mg-alkyls and Li-alkyls) which are used for activating the metal of the transition series normally used as a hydrogenation catalyst. Furthermore, the use of coupling agents capable of reacting with the active terminals of the polymeric chains (consisting of lithium dienyls or lithium styryls) causes the formation of radial structures of the star type, wherein the length of the branches is the same if the parent polymer has been synthesized in a batch reactor or different when the parent polymer has been synthesized in a continuous reactor; in this second case, the molecules with a lower molecular weight are preferably coupled, as the relative molar concentrations are more abundant. The result is an insignificant branching from a rheological point of view, in particular to achieve important results in terms of efficiency in the dispersion of the fillers during the preparation phase of the blend.

It has been found that, by using a partially hydrogenated vinylarene conjugated diene copolymer, having a branched structure, in which the molecules are bound by carbon-carbon bonds and wherein the branching is mainly oriented on the high or very high molecular weight chains, treads can be obtained with enhanced properties with respect to the treads obtained using the linear copolymers described in EP-A-775725.

SUMMARY

We provide raw elastomeric compositions comprising (a1), (a2), (b), (c) and (d) where (a1) is from 30 to 90% by weight of a partially hydrogenated vinylarene conjugated diene random elastomeric copolymer; (a2) is from 10 to 70% by weight of one or more diene rubbers; (b) is from 10 to 150 phr of silica; (c) is from 0.1 to 20 phr of a silane coupling agent; (d) is from 0.1 to 10 phr of a vulcanization agent; wherein (a1) and (a2) are elastomers and the total percentage by weight of the elastomers (a1) and (a2) in the composition is equal to about 100%; and the partially hydrogenated vinylarene conjugated diene random copolymer has a macromolecular structure with nodes that are statistically distributed along the macromolecular structure and from which polymeric chains branch off, and the bond between the nodes and the polymeric chain branches is a carbon-carbon bond.

DETAILED DESCRIPTION

This disclosure relates to a raw elastomeric composition comprising, the total amount of elastomers (a1)+(a2) contained in the said composition being equal to 100:
  (a1) from 30 to 90% by weight of a partially hydrogenated vinylarene conjugated diene random elastomeric copolymer;
  (a2) from 10 to 70% by weight, preferably from 20 to 60% by weight of one or more diene rubbers;
  (b) from 10 to 150 phr, preferably from 15 to 120 phr of silica;
  (c) from 0.1 to 20 phr of a coupling agent based on silane;
  (d) from 0.1 to 10 phr of a vulcanizing agent;
the above composition being characterized in that the partially hydrogenated random vinylarene conjugated diene copolymer has a structure with nodes statistically distributed in the molecule, from which polymeric chains branch out; the bond between said nodes and said branches being a carbon-carbon bond. The concentration of the carbon-carbon bonds is in the range of from $0.7 \times 10^{-7}$ to $3 \times 10^{-7}$ moles/kg of polymer.

The elastomeric composition can optionally contain carbon black (e) in an amount of 10 to 150 phr.

The use of phr (parts per 100 parts by weight of rubber) corresponds to the normal way of expressing the composition in the rubber industry.

Typical examples of vinylarenes are 2-vinylnaphthene, 1-vinylnaphthene, styrene and relative alkylated compounds. The vinylarene may be styrene.

The conjugated dienes are 1,3 dienes having from 4 to 12 carbon atoms, preferably from 4 to 8 carbon atoms. Examples of these dienes are 1,3-butadiene, isoprene, 2,3-dimethyl-1,3-butadiene, 1,3-pentadiene (piperylene), 2-methyl-3-ethyl-1,3-butadiene, 1,3-octadiene. The conjugated diene monomers may be selected from 1,3-butadiene and isoprene, preferably 1,3-butadiene.

In the following disclosure, reference will be made to styrene as a typical vinylarene and to butadiene as a typical conjugated diene, but without limitation to these compounds.

The term "styrene-butadiene random copolymer" means styrene-butadiene copolymers wherein the content of styrene in the form of blocks, with respect to the bound styrene, is 10% or less, as measured through the oxidative decomposition method described by I. M. Kolthoff et al. in J. Polymer Science, Vol. 1, page 429 (1946), or, more recently, by Viola et al. (Sequence distribution of styrene-butadiene copolymers by ozonolysis, high performance liquid chromatographic and gas chromatographic-mass spectrometric techniques, J. Chromatography A, 117 (1994)).

The above styrene-butadiene random copolymers (a1) have a styrene content from 15 to 50% by weight, preferably from 20 to 45% by weight.

As is known, butadiene can be bound to the polymeric chain as cis-1,4 bond (cis bond) trans-1,4 bond (trans bond), 1,2 bond (vinyl unit). The content of vinyl units is defined as the ratio between the quantity of vinyl units and the sum of the cis, trans and vinyl bonds. The vinyl unit content of the diene portion of the styrene-butadiene random copolymer, before the partial hydrogenation, is preferably from 10 to 80%, even more preferably from 20 to 70%. The above content of vinyl unit can be uniformly distributed along the polymeric chain, or it can be incremented or diminished along the chain itself.

The term "partially hydrogenated" means that the hydrogenation degree of the diene part of the styrene-butadiene copolymer is lower than 100%. Preferably, from 20 to 89% of the double bonds of the diene portion, even more preferably from 30 to 80%, should be hydrogenated.

The styrene-butadiene random copolymer (a1) of the present disclosure, has a weight average molecular weight ($M_w$) of 50,000 to 1,000,000 and a molecular weight distribution ($M_w/M_n$) of 1 to 10, preferably $M_w$ is from 300,000 to 800,000 and $M_w/M_n$ is from 1 to 5, more preferably from 1 to 3. The Mooney viscosity of the non-oil-extended polymer $ML_{1+4}$ at 100° C. is from 30 to 200, preferably from 50 to 150, whereas the corresponding polymer extended with oil extenders, preferably non-aromatic, has a Mooney viscosity at 100° C. within the range of 30-120.

As far as (a1) is concerned, G. Viola (Journal of Polymer Science: Part A: Polymer Chemistry, Vol. 35, 17-25 (1997)) shows the possible formation mechanism of the above-mentioned branched elastomers. The basic mechanism of the branched structure formation is of the radicalic type and involves the formation of macro-radicals following the extraction of an allyl proton positioned in a polybutadiene segment of the macromolecule, following a reaction between an alkyl radical which is formed by the reaction between an alkyl halide (typically an octyl bromide) and lithium butyl. The random extraction of the allyl proton from a macromolecule promotes the formation of macro-radicals characterized in that they have a molecular weight higher than $M_n$; the subsequent coupling of said macro-radicals causes the formation of branched structures characterized in that they have a long chain branching.

The branching degree of the copolymer (a1) is represented by the parameter alpha (α) which is lower than 0.58—a value corresponding to a linear (co)polymer. It should be remembered that linear (co)polymers have an alpha value of 0.58, whereas highly branched (co)polymers have an alpha value ranging from 0.35 to 0.40. A definition of alpha (α) is found below in the Examples.

The component (a2) of the composition, i.e. the diene rubber, is an elastomer selected from the group comprising natural rubber, polybutadiene, polyisoprene, styrene-butadiene copolymer, styrene-isoprene copolymer, isoprene-butadiene copolymer. If polybutadiene is used as component (a2), it is preferable for the same to be selected from polybutadiene cis-1,4, and high vinyl polybutadiene (vinyl content from 40 to 90%) and relative blends. When component (a2) is polyisoprene, it is preferably a polyisoprene cis-1,4 with a cis-1,4 percentage higher than 90% by weight.

The component (a2) is within the range of 10 to 70% by weight, preferably from 20 to 60% by weight, with respect to the sum of (a1)+(a2).

As far as component (b) is concerned, i.e. silica, any type of silica can be used, for example anhydrous silica obtained by precipitation from sodium silicate, with a dimension ranging from 20 to 80 nm and/or a surface area of 35-150 m$^2$/g. The quantity of silica is within the range of 10 to 150 phr, preferably from 15 to 120 phr.

As far as component (c) is concerned, this consists of organosilane which can interact with both the silica and with the partially hydrogenated vinylarene conjugated diene random copolymer, i.e. component (a1) of the composition. It is normally a functionalized trialkoxysilane or dialkoxysilane. In the preferred embodiment, component (c) has one of the three general formulae (E, F, G) indicated hereunder:

$$(RO)_3SiC_nH_{2n}S_mC_nH_{2n}Si(OR)_3 \quad (E)$$

$$(RO)_3SiC_nH_{2n}X \quad (F)$$

$$(RO)_3SiC_nH_{2n}S_mY \quad (G)$$

wherein

R represents an alkyl group having from 1 to 4 carbon atoms, the three Rs being the same or different;

"n" represents an integer from 1 to 6;

"m" represents an integer from 1 to 6;

X represents a mercaptan group, an amine group, a vinyl group, a nitrous group, an imido group, a chlorine atom or epoxy group;

Y represents a cyano group, a N,N-dimethylthiocarbamoyl group, a mercaptobenzotriazole group, or a methacrylate group.

Organo-silanes are preferred, having at least one sulphur atom, in particular for their reactivity towards the partially hydrogenated rubber in the vulcanization phase. In particular organo-silanes selected from bis(3-triethoxysilylpropyl)tetrasulphide; γ-mercaptopropyl methoxysilane; 3-thiocyanatepropyl triethoxysilane; trimethoxysilyl propyl mercaptbenzotriazole tetrasulphide, are preferred. The quantity of coupling agent (c) is within the range of 0.1 to 20 phr.

As far as the vulcanizing agent (d) is concerned, this is sulphur or a compound containing sulphur. Typical compounds containing sulphur are sulphur monochloride, sulphur dichloride, a disulphide, a polysulphide. The preferred vulcanizing compound is sulphur. The quantity of vulcanizing agent ranges from 0.1 to 10 phr. A vulcanization accelerator, an activator and a crosslinking agent can also be used together with the vulcanizing agent. The vulcanization accelerators include derivatives of guanidine, amino-aldehydes, ammonia-aldehydes, derivatives of thiazole, amido-sulphene compounds, thioureas, thiouram, dithiocarbamates, xanthates.

Typical activators are zinc oxide and stearic acid.

Typical examples of crosslinking agents comprise oxime derivatives, nitrous derivatives, polyamines, in addition to a radicalic initiator such as an organic peroxide and an azo-derivative.

It should be pointed out that components (b) and (c), i.e. silica and the coupling agent, can be substituted by a compound (b+c) deriving from the reaction of silane with silica. In other words, the blend of the present disclosure can contain, in partial or total substitution of the silica and silane, the reaction product between silane and silica.

With respect to the optional carbon black, this is the normal carbon black used for reinforcing elastomers. The quantity of carbon black ranges from 10 to 150 phr, preferably from 10 to 100 phr, even more preferably from 15 to 80 phr. In the preferred embodiment, the carbon black has a specific surface area, determined by means of nitrogen absorption ranging from 40 to 150 $m^2$/g and a DBP (dibutyl phthalate) absorption number, determined according to ASTM-D-2414 ranging from 70 to 180 ml/100 g. The carbon black is preferably in the form of small particles having a good oil absorption capacity. Even more preferably it is a carbon black in which —OH groups have been introduced in the surface, as these groups are reactive with respect to the organo-silane coupling agent.

Furthermore, the raw elastomeric composition can contain, when necessary, extending agents, reinforcing agents, fillers, antioxidants, anti-aging agents, UV-light absorbers, lubricants, foaming agents, flame-retardants, antistatic agents, dyes, plasticizers, process coadjuvants, scorch retardants, and other ingredients.

Process oil can be typically used as extender. The oil extender can be of the paraffin, naphthene or aromatic type and relative mixtures, preferably non-aromatic. Typical examples of oils with a low content of aromatic compounds are MES (Mild Extraction Solvate) oils or TDAE (Treated Distillate Aromatic Extract) oils in which the quantity of aromatic compounds is lower than 20%. The oil extenders are normally added in a quantity ranging from 10 to 50 parts of oil per 100 parts of rubber, preferably from 20 to 40 parts of oil per 100 parts of rubber.

The reinforcing materials comprise inorganic compounds such as activated calcium carbonate or organic compounds, such as resins with a high styrene content and phenol-formaldehyde resins. The above reinforcing materials should be contained in quantities lower than 80 parts by weight per 100 parts of elastomeric material.

Typical examples of fillers are calcium carbonate, clay, talc, aluminum hydroxide, diatomaceous earth, aluminum sulphate, barium sulphate.

The antioxidants or anti-aging agents comprise derivatives of amines such as diphenylamine and p-phenylenediamine, derivatives of quinoline and hydroquinone, monophenols, diphenols, thiobisphenols, hindered phenols, esters of phosphoric acid. These compounds, and relative mixtures, can be used within the range of 0.001 to 10 parts by weight per 100 parts of elastomeric material.

As far as the other materials are concerned, these are well-known in the art and can be used according to requirements.

The raw blend can be prepared by mixing components (a)-(d), possibly carbon black, and the formulation agents, using the typical equipment adopted for the mixing of elastomeric compounds, for example roll mixers, a Banbury internal mixer, extruders. The mixture is then formed and vulcanized. The mixing of the ingredients can be effected in a single step or in various passages. In this latter case, a first method consists of first mixing the elastomeric components (a1) and (a2), the silica (b) and the coupling agent (c) and possibly carbon black (e) and other additives in an internal mixer of the Banbury type and subsequently the vulcanizing agent (d) and accelerators in a roll mixer. In another method, again with various steps, the silica and coupling agent are first mixed and reacted and the product of this reaction is subsequently mixed with the elastomers (a1) and (a2) and possibly carbon black and finally with the vulcanizing agent.

It should be remembered that the greater or lesser processability of the elastomeric materials, i.e. the speed and efficiency with which the reinforcing fillers (in particular silica and carbon black), and also the vulcanizing agents, the accelerators and other additives are absorbed and subsequently dispersed inside the rubber matrix, depends on the viscoelastic characteristics of the material. This subject has been studied by Tokita N. and Pliskin I. (1973, *Rubber Chemistry and Technology*: Vol. 46, page 1173) who identify different structural types of macromolecules which behave differently when the preparation operation of the blend is effected. On the basis of these studies, it is possible to rationalize a behavior known to the transformation industry whereby polymers with a molecular weight distribution with a $M_w/M_n$ dispersion index <1.3 (and therefore typical of batch polymerization) have considerable difficulty in incorporating the fillers, whereas polymers having a molecular weight distribution with a $M_w/M_n$ dispersion index ranging from 1.8 to 2.5 have a good processability. This characteristic can be further improved by the introduction of long chain branchings naturally present in the styrene-butadiene copolymers prepared in emulsion or generated, in the case of statistic styrene-butadiene copolymers prepared in solution by means of anionic polymerization, by reaction between the active chain-end with alkyl bromides (see U.S. Pat. No. 6,858,683).

An improvement in the processability characteristics, intended as being optimum behavior in the mixing phase of the rubber with the various fillers and their subsequent dispersion, therefore requires a polymer obtained by means of a continuous process (to have the right compromise between the elastic and viscous properties, illustrated by the $M_w/M_n$ ratio centred on the value of 2) in which the active chain-ends must be as numerous as possible to be able to maximize the efficiency of possible post-modification reactions with which branchings can be introduced.

As far as the preparation of (a1) is concerned, this is prepared in a continuous process consisting of three distinct steps, i.e.:
  (A) preparation of the linear vinylarene conjugated diene random copolymer;
  (B) branching of the linear random copolymer obtained in step (A) by treatment with alkyl halides, preferably alkyl bromides;
  (C) partial hydrogenation of the branched random copolymer obtained in step (B).

Step (A) is described in the copending patent application in the name of the same applicant MI 06 A 00385 (European Patent Application 07 003 216.4). This is a copolymerization carried out under isothermal conditions in a hydrocarbon solvent, at a temperature ranging from 30 to 120° C., preferably from 50 to 110° C., even more preferably from 80 to 110° C., in the presence of at least one initiator selected from organo-lithium derivatives, $R(Li)_x$ wherein R is a hydrocarbyl group containing from 1 to 20 carbon atoms, preferably from 2 to 8, and x is an integer from 1 to 4, and a particular modifier, consisting of a chelating ether, typically 2-methoxyethyltetrahydrofuran (THFA-ethyl). The use of the above modifier is absolutely necessary for avoiding termination reactions of the polymeric chains. Further details on the above process and products thus obtained are provided in the above copending patent application of the same applicant MI 06 A 00385. Specific examples of organo-lithium derivatives are lithium n-butyl, lithium n-propyl, lithium isobutyl, lithium t-butyl, lithium amyl.

As far as step (B) is concerned, this is effected according to what is described in U.S. Pat. No. 6,858,683. Step (B) can be effected starting from the copolymer obtained in step (A) in which all the active centres are exhausted. Step (B), however, is preferably effected starting directly from the solution of living polymer obtained at the end of step (A). According to this latter technique, at the end of the vinylarene conjugated diene copolymerization, a quantity of lithium alkyl of the above formula $R(Li)_x$, from 1 to 4 times molar with respect to the quantity of lithium alkyl used in step (A) is added to the polymeric solution, followed by a quantity of R1-Br (R1 being a monofunctional $C_1$-$C_{30}$, preferably $C_3$-$C_{10}$, hydrocarbyl radical) in certain ratios with respect to the total lithium alkyl used. Examples of compounds of formula R1-Br are monobromomethane, monobromethane, monobromohexane, monobromooctane, monobromocyclohexane, monobromobenzene. Ratios of R1-Br with respect the whole quantity of organo-lithium present in the polymeric solution range from 0.6/1 to 1/1.

Steps (A) and (B) can be carried out at temperatures ranging from 40 to 140° C., preferably, from 60 to 120.

With respect to step (C), i.e. the partial hydrogenation step of the branched and random copolymer obtained at the end of step (B), this is carried out as follows. The partial hydrogenation processes are normally effected under bland conditions at a pressure of about 5-30 kg/cm$^2$ or lower, and temperatures of about 60-120° C. or lower, preferably in the presence of organo-derivatives of titanium alone or combined with organometallic compounds of lithium, magnesium or aluminum (see for example U.S. Pat. No. 4,501,857; U.S. Pat. No. 4,673,714; U.S. Pat. No. 5,948,869).

We also provide, more generally, to vulcanized products prepared starting from the composition of the present disclosure. The above vulcanized products, particularly those according to (a2) are selected from polydienes with a high content of cis units, they are particularly suitable for the construction of tire treads, particularly for motor vehicles, as they have an excellent grip on wet surfaces or on ice even if they have a low rolling resistance.

In general terms, the important results obtained in the definition of the microstructural and compositional characteristics for the identification of optimum dynamic tread properties under particular conditions of use, seem to have so far caused a kind of technical stalemate (stall) as the grip properties on wet surfaces or in any case under low grip conditions can be obtained by moving structural variables which cause an increase in the rolling resistance. It is known that (with the same $T_g$) the increase in the styrene fraction (and consequent decrease in the vinyl content) in the SBR copolymer, causes a greater hysteresis of the rubber with a consequent increase in the grip, but a deterioration in the rolling resistance (see for example the tan δ values measured at 60° C. and 1 Hz at 5% deformation indicated in the next-to-last column of Table 4). The partial hydrogenation of an elastomeric material, on the other hand, confirming modified macromolecular-macromolecule interactions, causes an increase in the Mooney viscosity, provided degradation phenomena of the polymeric chain are active, due, as already mentioned, to the interaction of the alkylating agents forming the hydrogenation catalyst with carbon-heteroatom bonds (Si, O, Sn). It is also known that the presence of a fraction of branched molecules, even better if the branching is of the long-chain-branching type, favors the dispersion of the filler and consequently causes an improvement in the elastic characteristics of the material.

It should also be taken into account that the dynamic response required also lies in the interaction between the styrene-butadiene copolymer (a1) and the polydiene (a2) with a high cis content (polybutadiene and/or polyisoprene) normally used in the construction of tire treads. The compatibility of these materials decreases with an increase in the styrene content of the styrene-butadiene copolymer.

It has now been surprisingly found that statistic styrene-butadiene branched copolymers (a1), in particular those having a high styrene content, have an improved compatibility with polydiene polymers (a2), making it possible to prepare elastomeric blends which, together with the increase in the grip properties, have much better rolling resistance values with respect to the analogous properties measured on linear copolymers. Furthermore the presence of long-chain branchings causes a further improvement in the dynamic properties thanks to the optimum dispersion of the fillers during the preparation phase of the blend.

The following examples are provided for a better understanding of the disclosure.

EXAMPLES

Characterization of Synthesized Copolymers

1. Determination of Bound Styrene and the Polybutadiene Microstructure

The method is based on the calculation of the ratios between the intensity of the bands attributable to styrene and the three butadiene isomers (trans, vinyl and cis); the spectral areas used for the analytical determination, relating to the cis, trans and 1,2 isomers of butadiene and styrene prove to be: 1018 and 937 cm$^{-1}$ for the trans isomer, 934 and 887 cm$^{-1}$ for the 1,2 isomer (to be corrected due to the interference of the styrene), 800 and 640 cm$^{-1}$ for the cis isomer and from 715 to 680 cm$^{-1}$ for styrene. The measurement of the absorbances in the maximum points and a knowledge of the extinction coefficient values, measured on standard polymers characterized via $^1$H-NMR, allows the quantity of the various butadiene structures and the quantity of styrene to be calculated, by means of the Lambert-Beer law.

2. Determination of the Molecular Mass Distribution (MWD)

The determination of the molecular mass distribution is effected by means of gel permeation chromatography (GPC) also known as exclusion chromatography effected by passing a solution in THF of the polymer, the object of the analysis, through a series of columns containing a solid phase consisting of crosslinked polystyrene with pores having various dimensions.

Instrumental Configuration:
  Chromatograph HP 1090
  Solvent THF
  Temperature 25° C.
  PL-Gel Columns $10^5$-$10^5$-$10^4$-$10^3$
  RI detector HP 1047 A The determination of the molecular mass is effected according to the Universal Calibration method using the following values for k and α, in relation to the quantity of styrene:

Styrene = 25%  k = 0.000389  α = 0.693

Styrene = 30%  k = 0.000368  α = 0.693

Styrene = 40%  k = 0.000338  α = 0.693

3. Determination of the average molecular weight and measurement of the branching degree by means of the SEC/MALLS technique according to an internal method taken from the work described in *Application Note, Nr. 9*, Wyatt Technology and Pavel Kratochvil, *Classical Light Scattering from Polymer Solutions*, Polymer Science Library, 5. Elsevier Science Publishers B.V. 1987. By coupling a multi-angle light diffusion detector (MALLS) with a traditional elution system SEC/RI, it is possible to contemporaneously effect the absolute measurement of the molecular weight and gyration radius of the macromolecules which are separated from the chromatographic system. The quantity of diffused light from a macromolecular species in solution can in fact be used directly for obtaining its molecular weight, whereas the angular variation of the scattering is directly correlated to the average dimensions of the molecule in solution. The fundamental relation which is used is the following:

$$\frac{K^*c}{R_0} = \frac{1}{M_w P_0} + 2A_2 c \quad (1)$$

wherein:
$K^*$=optical constant, which depends on the wave-length of the light used, the dn/dc of the polymer, the solvent used
$M_w$=weight average molecular weight
c=concentration of the polymeric solution
$R_\theta$=diffused light intensity measured at an angle θ
$P_\theta$=function which describes the diffused light angular variation
$A_2$=second virial coefficient of the solvent, equal to 1 for an angle θ equal to 0.

For very low concentrations (typical of a SEC system), 1 is reduced to $$\frac{K^*c}{R_\theta} = \frac{1}{M_w P_0} \quad (2)$$

and effecting the measurement on various angles, the extrapolation at zero angle of the function $K^*c/R_\theta$ in relation to $sen^2 \theta/2$ directly provides the molecular weight from the intercept value and gyration radius from the slope.

Furthermore, as this measurement is effected for every slice of the chromatogram, it is possible to obtain a distribution of both the molecular weight and also of the gyration radius.

The macromolecular dimensions in solution are directly correlated to their branching degree: with the same molecular weight, the smaller the dimensions of the macromolecule with respect to the corresponding linear macromolecule, the higher the branching degree; as a macromolecule having nodes in its interior (radial structures and branched structures) has, with the same molecular weight, a lower hydrodynamic volume with respect to a linear molecule, the slope of the line described above (a coefficient) will be greater or lesser depending on the lower or greater interconnection degree of the structures. In particular, for linear macromolecules, the proportionality coefficient between the gyration radius and molecular weight, proves to be equal to 0.58, whereas for branched molecules said value becomes progressively lower with an increase in the number of nodes present in the macromolecule. To provide an example, the statistical styrene-butadiene copolymer prepared by radicalic polymerization in emulsion (E-SBR) has an α value equal to 0.35-0.38.

Information relating to the macrostructure of a polymer is quantitatively deduced by evaluating the branching index $g_M$, which is defined for each macromolecule, as a ratio between the average quadratic gyration radius of the branched macromolecule and that of the linear macromolecule, with the same molecular weight:

$$g_{Mi} = \left[\frac{<r^2>_b}{<r^2>_l}\right] M_i \quad (3)$$

The average branching index $g_M$ represents the average of this ratio in relation to the molecular mass distribution, and ranges from 0 to 1.

Instrumental Configuration:
RI HP 1047 A detector
MALLS Wyatt Technology mod. DAWN-DSP
KMX16-CROMATIX differential refractometer 4. Determination of the Presence of Sequences and Polystyrene Blocks The method comprises a chemical degradation of styrene/butadiene copolymers by ozonolysis of the butadiene double bonds, followed by reduction and HPLC elution of the oligomers produced, in order to obtain a quantitative evaluation of the distribution of the styrene units in random and partially random SBRs. The possibility of having a double UV-MS detector allows the quantitative determination as % AREA from the UV plot and contemporaneously a control of the molecular weights of the species eluted, to be effected.

5. Determination of the Mooney and ΔMooney Viscosity

The determination of the Mooney viscosity was effected at 100° C. with a rotor L and times (1+4); the variation in the Mooney viscosity (ΔMooney) is defined as the difference in the Mooney viscosity of the blend and the raw polymer. The variation in the Mooney viscosity as defined forms an evaluation system of the dispersion degree of the filler in the elastomeric mixture; the better the dispersion, the lower the increase in the Mooney viscosity will be.

ASTM D1646

6. Determination of the Tensile Properties (Ultimate Elongation, Elongation to Break, Moduli):

ASTM D 412

7. Determination of the Dynamic Characteristics (Tan δ):

The measurement of the damping factor correlated to the rolling resistance (tan δ RR) is effected at 60° C., 5% deformation at a frequency of 1 Hz, whereas the tan δ value correlated to the grip when braking or in bends presented by the tread blend (tan δ Wet) is measured at a temperature of 0° C., at a frequency of 0.1 Hz and with a deformation established at 0.1%.

Comparative Example 1 (LC1)

Preparation in Continuous of the Linear Styrene-Butadiene Copolymer (Styrene 25%; 1,2 66%)

The experiment is carried out on two reactors of the CSTR type in series, each having a volume of 100 L, destined for copolymerization, followed by a third 50 L reactor to guarantee the almost complete conversion of the monomers (>95.5%); all the reactors are equipped with a wall-cleaning system, consisting of a wall-scraper integral with the shaft of the stirrer. The feeding of the ingredients in the reaction is effected by means of mass-type measurers. The mixture of reagents (cyclohexane, styrene, butadiene, modifier, consisting of THFA-methyl and antifouling agent) is prepared in a stirred reactor and under nitrogen pressure, in a quantity sufficient for guaranteeing a significant running, maintaining the composition of the feeding of the reagents constant with time. The initiator (lithium n-butyl in a hexane solution) is fed at the inlet of the first reactor. The first polymerization reactor is of the boiling type; it is not run completely full, and part of the solvent is condensed and recycled to the reactor; the pressure regulation of the reactor consequently characterizes and regulates the temperature. All the ingredients are fed from the bottom of the reactor; the variation of the residence times is effected through a variation in the feeding flow-rates. A further control of the temperature is possible through the regulation of the temperature of the solvent and monomers at the inlet of the first reactor, using heat exchangers.

A copolymerization of butadiene and styrene was effected under the conditions described above, by feeding the solution, in hexane, of the monomers containing 9% by weight of butadiene and 3% by weight of styrene, together with a quantity of THFA-methyl which is such as to maintain the ratio between lithium and the randomizing agent within the range of 5.3-5.7. The total quantity of reagents and solvent was regulated so that the residence time in the first reactor proved to be 60 minutes. The quantity of lithium n-butyl fed proved to be equal to 0.024±0.003 g per 100 g of the blend of monomers (hereinafter called phm: per hundred monomers) under the above conditions, at a temperature of 57±2° C. A conversion was obtained in the first reactor equal to 75±5%, whereas in the second reactor the conversion was higher than 95%. Vapor was circulated in the jacket in a suitable quantity for keeping the temperature within the range of 57±2° C., in order to maintain the desired temperature in the second reactor, whose reaction rate is lower with respect to the first reactor due to the lower concentration of monomers. In the third reactor, also maintained at a temperature of 57±2° C., the reaction was completed and the resulting conversion was higher than 96%.

At the outlet of the third reactor, trimethylchlorosilane was added to the polymeric solution in a quantity equal to 90% (in moles) of the lithium butyl fed to terminate the active terminals of the copolymer. A non-aromatic oil TDAE was added to the polymeric solution using a mixer on line, in an amount of 27.5±1.5%, together with a mixture of antioxidants consisting of IRGANOX™ 565 and IRGAFOS™ 168 in such a quantity that their content in the rubber was equal to 0.1 and 0.4%, respectively.

The polymer was separated from the solvent by stripping under a vapor flow and was subsequently mechanically dried by means of an extruder. The measurement of the molecular weight distribution, carried out by gel permeation chromatography (GPC) gave a value of the number average molecular weight $M_n$, equal to 296,000 and a dispersion index value $(M_w/M_n)$ equal to 2. The GPC-MALLS analysis gave an alpha value equal to 0.58 typical of a linear polymer. The IR analysis gave a content of 1,2 units of 66.2%.

The oxidative demolition of the polymer followed by HPLC analysis showed the absence of styrene blocks; the glass transition temperature (Tg) measured by means of differential thermal analysis (DSC) gave a value of −19.8° C.

The Mooney viscosity effected on the oil-extended polymer [ML (1+4) at 100° C.], gave a value of 54.

The conversion measurement was effected by the gaschromatographic determination of the residual monomers in the polymeric solution. The characteristics of the polymer obtained are indicated in Table 1.

Comparative Example 2 (LC2)

Preparation in Continuous of the Linear Styrene-Butadiene Copolymer (Styrene 40%; 1,2 40%)

The experiment is carried out on two reactors of the CSTR type in series, the first having a volume of 100 L, the second a volume of 50 L, sufficient for guaranteeing the complete conversion of the monomers (>99%). Both of the reactors are equipped with a wall-cleaning system, consisting of a wall-scraper integral with the shaft of the stirrer. The reagent mixture containing 7.2% by weight of butadiene and 4.8% by weight of styrene is fed, regulating the temperature so as to maintain the temperature in the first reactor at a value within the range of 92±2° C. A quantity of lithium n-butyl equal to 0.024±0.003 phr and THFA-ethyl in such a quantity as to maintain the THFA-ethyl/Li molar ratio within the range of 6.2-6.5, were fed together with the mixture of monomers.

A non-aromatic oil TDAE was added to the polymeric solution using a mixer on line, in an amount of 27.5±1.5%, together with a mixture of antioxidants consisting of IRGANOX™ 565 and IRGAFOS™ 168 in such a quantity that their content in the rubber was equal to 0.1 and 0.4%, respectively. A polymer was obtained under these conditions, whose analysis is indicated in Table 1.

Comparative Example 3 (LC3)

Preparation in Continuous of the Linear Styrene-Butadiene Copolymer (Styrene 25%; 1,2 25%)

The experiment is carried out on two reactors of the CSTR type in series, the first having a volume of 100 liters, the second a volume of 50 liters, sufficient for guaranteeing the complete conversion of the monomers (>99%). Both of the reactors are equipped with a wall-cleaning system, consisting of a wall-scraper integral with the shaft of the stirrer. The reagent mixture consisting of a solution in hexane containing 9% by weight of butadiene and 3% by weight of styrene is fed, regulating the temperature so as to maintain the temperature in the first reactor at a value within the range of 93±3° C. A quantity of lithium n-butyl equal to 0.024±0.003 phr and THFA-ethyl in such a quantity as to maintain the THFA-ethyl/Li molar ratio within the range of 2.3-2.7, were fed together with the mixture of monomers.

A non-aromatic oil TDAE was added to the polymeric solution using a mixer on line, in an amount of 27.5±1.5%, together with a mixture of antioxidants consisting of IRGANOX™ 565 and IRGAFOS™ 168 in such a quantity that their content in the rubber was equal to 0.1 and 0.4%, respectively. A polymer was obtained under these conditions, whose analysis is indicated in Table 1.

TABLE 1

| Polym | T °C. | THFA-Et/Li | $M_w$ $(10^{-3})$ | $M_w/M_n$ | Styrene % | 1, 2% | α | Conv. | Tg °C. | $M_L^a$ |
|---|---|---|---|---|---|---|---|---|---|---|
| LC1 | 57 ± 2 | 5.3-5.7 | 592 | 2 | 24.8 | 66.2 | 0.58 | 97.6 | −19.8 | 54 |
| LC2 | 92 ± 2 | 6.2-6.5 | 600 | 2.3 | 41.3 | 39.9 | 0.56 | 98.3 | −20.5 | 55 |
| LC3 | 93 ± 3 | 2.3-2.7 | 610 | 2.2 | 25.7 | 24.8 | 0.55 | 98.9 | −50.2 | 56 |

α = Mooney viscosity of the oil-extended polymer

Example 4 (BC1)

Preparation in Continuous of the Branched Styrene-Butadiene Copolymer (Styrene 25%; 1,2 65%)

A copolymerization of butadiene and styrene was carried out, using the same plant configuration described in Example 1, feeding a solution in hexane containing 9% by weight of butadiene and 3% by weight of styrene together with a quantity of THFA-ethyl is such as to maintain the ratio between lithium and the randomizing agent within the range of 5.3-5.7. The total quantity of reagents and solvent was regulated so that the residence time in the first reactor was 60 minutes. The quantity of lithium n-butyl fed proved to be equal to 0.024±0.003 g per 100 g of the blend of monomers. Under the above conditions, at a temperature of 57±2° C., a conversion was obtained in the first reactor equal to 75±5%, whereas in the second reactor the conversion was higher than 95%. Vapor was circulated in the jacket in a suitable quantity for keeping the temperature within the range of 62±2° C., in order to maintain the desired temperature in the second reactor, whose reaction rate is lower with respect to the first reactor due to the lower concentration of monomers. In the third reactor, also maintained at a temperature of 62±2° C., the reaction was completed and the resulting conversion was higher than 98%.

At the end of the reaction train, an aliquot of lithium butyl equal to 0.05±0.03 phm was added, using a specific mixer on line, followed by the addition of 0.150 phm of Br-octyl, the residence time in the mixer being about a fifth of that in the first reactor. A non-aromatic oil TDAE was added to the polymeric solution using a second mixer on line, in an amount of 27.5±1.5%, together with a mixture of antioxidants consisting of IRGANOX™ 565 and IRGAFOS™ 168 in such a quantity that their content in the rubber was equal to 0.1 and 0.4%, respectively.

The characteristics of the polymer are indicated in Table 2.

Example 5 (BC2)

Preparation in Continuous of the Branched Styrene-Butadiene Copolymer (Styrene 40%; 1,2 40%)

A branched styrene-butadiene copolymer was prepared under analogous synthesis conditions to those described in Example 2, with a styrene content equal to 40.5% and a vinyl content equal to 40.2%, feeding the mixture of reagents containing 7.2% by weight of butadiene and 4.8% by weight of styrene and regulating the temperatures so as to maintain a temperature of 92±2° C. in the first reactor. A quantity of lithium n-butyl equal to 0.024±0.003 phr and THFa-ethyl in such a quantity as to maintain the THFA-ethyl/Li molar ratio within the range of 6.2-6.5, were fed together with the mixture of monomers.

At the end of the reaction train, an aliquot of lithium butyl equal to 0.05±0.03 phm was added, using a specific mixer on line, followed by the addition of 0.150 phm of Br-octyl, the residence time in the mixer being about a fifth of that in the first reactor. A non-aromatic oil TDAE was added to the polymeric solution using a second mixer on line, in an amount of 27.5±1.5%, with a mixture of antioxidants consisting of IRGANOX™ 565 and IRGAFOS™ 168 in such a quantity that their content in the rubber was equal to 0.1 and 0.4%, respectively.

The characteristics of the polymer are indicated in Table 2.

Example 6 (BC3)

Preparation in Continuous of the Branched Styrene-Butadiene Copolymer (Styrene 25%; 1,2 25%)

A branched styrene-butadiene copolymer was prepared under analogous synthesis conditions to those described in Example 3, with a styrene content equal to 26.6% and a vinyl content equal to 26.0%, feeding a solution of hexane containing 9% by weight of butadiene and 3% by weight of styrene and regulating the temperatures so as to maintain a temperature within the range of 93±3° C. in the first reactor. A quantity of lithium n-butyl equal to 0.024±0.003 phr and THFA-ethyl in such a quantity as to maintain the THFA-ethyl/Li molar ratio within the range of 2.3-2.7, were fed together with the mixture of monomers. At the end of the reaction train, an aliquot of lithium butyl equal to 0.05±0.03 phm was added, using a specific mixer on line, followed by the addition of 0.150 phm of Br-octyl, the residence time in the mixer being about a fifth of that in the first reactor. A non-aromatic oil TDAE was added to the polymeric solution using a second mixer on line, in an amount of 27.5±1.5%, with a mixture of antioxidants consisting of IRGANOX™ 565 and IRGAFOS™ 168 in such a quantity that their content in the rubber was equal to 0.1 and 0.4%, respectively.

The characteristics of the polymer are indicated in Table 2.

TABLE 2

| Polym | T °C. | THFA-Et/Li | $M_w$ $(10^{-3})$ | $M_w/M_n$ | Styrene % | 1, 2% | α | Conv. | Tg °C. | $M_L^a$ |
|---|---|---|---|---|---|---|---|---|---|---|
| BC1 | 57 ± 2 | 5.3-5.7 | 600 | 2.2 | 25.2 | 65.2 | 0.51 | 97.6 | −20.5 | 55 |
| BC2 | 92 ± 2 | 6.2-6.5 | 615 | 2.5 | 40.5 | 40.2 | 0.52 | 98.3 | −19.5 | 57 |
| BC3 | 93 ± 3 | 2.3-2.7 | 590 | 2.4 | 26.6 | 26.0 | 0.51 | 98.9 | −49.2 | 54 |

α = Mooney viscosity of the oil-extended polymer

Comparative Example 7

Preparation of LCH1

A styrene-butadiene copolymer containing 25.5% of styrene and 65.8% of vinyl units with a molecular weight Mw equal to 587,000 and a dispersion index $M_w/M_n$ equal to 2.1, was prepared under the same synthesis conditions described in Example 1.

After the addition of a termination agent consisting of trimethylchlorosilane fed in a molar ratio equal to 0.8:1 with respect to the lithium butyl used for the polymerization, a suspension of titanium dicyclopentadienyl dichloride in hexane was added to the polymeric solution in such a quantity that the quantity of metallic titanium referring to the rubber was 150 ppm. A solution of Magnesium diisobutyl in hexane was added to the solution containing the polymer and titanium dicyclopentadienyl dichloride in such a quantity that the ratio between Mg and Ti fell within the range of 1:1-2:1. The ratio between Mg and Ti is not unequivocally determined but depends on various factors such as, for example, the residual living degree of the polymeric solution or possible excess of termination agent. The optimum quantity of magnesium diisobutyl is therefore regulated during the hydrogenation reaction on the basis of the thermal tonality of the reaction. The hydrogenation was carried out in a reactor in continuous with a height/diameter ratio equal to 5, equipped with an axial stirrer and with a volume of 50 L at a temperature of 100° C. and a pressure of 6 total atmospheres. The temperature control of the polymeric solution is effected by passing glycolated water in a jacket situated outside the reactor. A partially hydrogenated polymer is obtained under the above conditions, with residence times of 30 minutes (GI=74.5%), whose characteristics are indicated in Table 3.

At the outlet of the hydrogenation reactor, a mixture consisting of the antioxidants IRGANOX™ 565 (0.1%) and IRGAFOS™ 168 (0.5%) was added to the polymeric solution. After the addition of the antioxidants, an oil-extender TDAE was added to the polymeric solution in a quantity equal to 27.5±1.5%. After the addition of oil, the polymeric solution was sent to the stirred recipients containing boiling water heated by the continuous addition of water vapor to eliminate the solvent; after separation from the water by passage over sieves, the resulting clots of wet rubber are sent for mechanical drying consisting of mechanical extruders. The characteristics of the polymer are indicated in Table 3.

Comparative Examples 8 and 9

Preparation of LCH2 and LCH3

Two linear polymers were prepared in the same synthesis configuration described in Examples 2 and 3, one with a composition having a styrene content equal to 40.8% and a vinyl content equal to 40.3% (parent polymer of LCH2), and the other with a styrene content equal to 26.2% and a vinyl content equal to 25.8% (parent polymer of LCH3). These polymers, partially hydrogenated in a plant configuration similar to that described in Example 7, provided partially hydrogenated linear polymers LCH2 and LCH3 to which TDAE oil was subsequently added (27.5±1.5%) together with a mixture consisting of the antioxidants IRGANOX™ 565 (0.1%) and IRGAFOS™ 168 (0.5%). The characteristics of the polymer are indicated in Table 3.

Example 10

Preparation of BCH1, BCH2 and BCH3

Three branched polymers were prepared in the same synthesis configuration used for preparing the branched polymers BC1, BC2 and BC3, whose preparation is described in Examples 4, 5 and 6. The first had a styrene content equal to 25.5% and a vinyl content equal to 67.1% (parent polymer of BCH1), the second a styrene content equal to 40.9% and a vinyl content equal to 40.4% (parent polymer of BCH2), the third a styrene content equal to 27.1% and a vinyl content equal to 25.5% (parent polymer of BCH3). The three polymers were partially hydrogenated as described in Example 7. TDAE oil (27.5±1.5%) was added to the polymers thus prepared, together with a mixture consisting of the antioxidants IRGANOX™ 565 (0.1%) and IRGAFOS™ 168 (0.5%). The characteristics of the polymer are indicated in Table 3.

Example 11

Preparation of BCH4

A branched styrene-butadiene copolymer was prepared under analogous synthesis conditions to those described in Example 5, with a styrene content equal to 40.8% and a vinyl content equal to 40.6%, feeding the mixture of reagents containing 7.2% by weight of butadiene and 4.8% by weight of styrene and regulating the temperatures so as to maintain a temperature within the range of 92±2° C. in the first reactor. A quantity of lithium n-butyl equal to 0.024±0.003 phr and THFA-ethyl in such a quantity as to maintain the THFA-ethyl/Li molar ratio within the range of 6.2-6.5, were fed together with the mixture of monomers. At the end of the reaction train, an aliquot of lithium butyl equal to 0.05±0.03 phm was added, using a specific mixer on line, followed by the addition of 0.150 phm of Br-octyl, the residence time in the mixer being about a fifth of that in the first reactor, and subsequently a suspension of titanium dicyclopentadienyl dichloride in hexane in such a quantity that the quantity of metallic titanium referring to the rubber was 150 ppm. A solution of magnesium diisobutyl in hexane was added to the solution containing the polymer and titanium dicyclopentadienyl dichloride in such a quantity that the ratio between Mg and Ti fell within the range of 1:1±2.5:1. The ratio between Mg and Ti is not unequivocally determined but depends on various factors such as, for example, the residual living degree of the polymeric solution or possible excess of branching agent. The optimum quantity of magnesium diisobutyl is therefore regulated during the hydrogenation reaction on the basis of the thermal tonality of the reaction. The hydrogenation was carried out in a reactor in continuous with a height/diameter ratio equal to 5, equipped with an axial stirrer and with a volume of 50 liters at a temperature of 100° C. and a pressure of 6 total atmospheres. The temperature control of the polymeric solution is effected by passing glycolated water in a jacket situated outside the reactor. A partially hydrogenated polymer is obtained under the above conditions, with residence times of 15 minutes (GI=44.1%), whose characteristics are indicated in Table 3.

Using a second mixer on line, non-aromatic oil TDAE was added to the polymeric solution in a quantity equal to 27.5±1.5%, together with a mixture of antioxidants consisting of IRGANOX™ 565 and IRGAFOS™ 168 in such a quantity that their content in the rubber proved to be equal to 0.1 and 0.4% respectively.

Comparative Example 12

Preparation of BCH5

A branched copolymer is prepared in the same synthesis configuration described in Example 11, containing a quantity of styrene equal to 40.9%, which is hydrogenated according to what is described in Example 11 with a residence time of 45 minutes and a final GI equal to 90%. TDAE oil 27.5±1.5% is subsequently added to the polymer, together with a mixture of antioxidants consisting of IRGANOX™ 565 and IRGAFOS™ 168 in such a quantity that their content in the rubber proved to be equal to 0.1 and 0.4% respectively.

The characteristics of the polymer are indicated in Table 3.

TABLE 3

| | $M_w$ $(10^{-3})$ | $M_w/M_n$ | Styrene % | Gl % | α | Tg (° C.) | $M_I{}^a$ |
|---|---|---|---|---|---|---|---|
| LCH1 | 598 | 2.2 | 25.2 | 74.5 | 0.58 | −20.2 | 77 |
| LCH2 | 605 | 2.8 | 40.5 | 73.9 | 0.56 | −23.5 | 85 |
| LCH3 | 617 | 2.4 | 26.6 | 75.5 | 0.55 | −49.2 | 70 |
| BCH1 | 610 | 2.3 | 25.2 | 76.2 | 0.51 | −21.1 | 75 |
| BCH2 | 625 | 2.9 | 40.5 | 75.2 | 0.52 | −24.2 | 93 |
| BCH3 | 598 | 2.5 | 26.6 | 74.4 | 0.51 | −50.1 | 76 |
| BCH4 | 630 | 2.9 | 40.5 | 44.1 | 0.52 | −23.1 | 78 |
| BCH5 | 611 | 3 | 40.5 | 89.8 | 0.53 | −25.3 | 100 |

α = Mooney viscosity of the oil-extended polymer

The above Table 3 indicates the data relating to the copolymers (a1) of the present disclosure (from BCH1 to BCH4) together with the data relating to hydrogenated linear copolymers excluded from the present disclosure (LCH1-LCH3) and a branched copolymer with an excessive hydrogenation degree, also excluded from the present disclosure (BCH5).

due to the possible presence of polyethylene microcrystallinities possibly present and deriving from the hydrogenation of polybutadiene sequences polymerized in 1,4 position.

Evaluation of Raw and Vulcanized Polymers

Technical blends were prepared using polymers LC1 to BCH5, whose characteristics are indicated in Tables 1, 2 and 3, adopting as inorganic base a functionalized silica (COUPSIL™ 8113 GR) according to the following formulation:

oil-extended SBR 103 phr
High-cis polybutadiene (NEOCIS™ BR40) 34.5 phr
COUPSIL™ 8113 GR: 87.5 phr (reaction product between bis(triethoxysilyl propyl)polysulphide and precipitated silica)
SANTOFLEX™ 13: 1 phr
ANOX™ HB: 1 phr
Zinc oxide: 2.5 phr
Stearic acid: 1 phr
ROWAX™ 721: 1.5 phr
Diphenyl guanidine (DPG): 2 phr
N-cyclohexyl-2-benzothiazyl Sulfeneamide (CBS): 1.7 phr
Sulfur: 1.4 phr
POLYPLASTOL™ 19: 3 phr The various ingredients were mixed in a Braebender mixer with a 350 cc chamber and rotors of the Banbury type at a starting temperature of 60° C. and a discharge temperature (6 minutes of mixing cycle) of 150° C. The accelerating agent was then added in an open mixer followed by homogenization for a total of 6 minutes.

The vulcanization process was effected by molding the test-samples for 40 minutes at 151° C.

The results of the characterizations effected on the raw and vulcanized blends are indicated in Table 4.

TABLE 4

| | Raw Blend | | Vulcanized blend | | | | |
|---|---|---|---|---|---|---|---|
| Sample | Mooney Bled | ΔMooney | Modulus 200% | Ultimate tensile strength (CR) MPa | Ultimate ElongaTion (AR)% | tan δ RR | tan δ Wet |
| LC1 | 105 | 51 | 5.1 | 13.4 | 340 | 0.290 | 0.201 |
| LC2 | 101 | 46 | 4.2 | 15.1 | 420 | 0.293 | 0.209 |
| LC3 | 100 | 44 | 4.1 | 15.3 | 410 | 0.255 | 0.160 |
| BC1 | 95 | 40 | 3.6 | 16.6 | 420 | 0.262 | 0.185 |
| BC2 | 94 | 37 | 3.5 | 16.9 | 440 | 0.264 | 0.203 |
| BC3 | 92 | 38 | 3.3 | 17.0 | 450 | 0.235 | 0.181 |
| LCH1 | 114 | 60 | 6.0 | 17.3 | 390 | 0.298 | 0.203 |
| LCH2 | 142 | 57 | 5.7 | 17.9 | 410 | 0.299 | 0.201 |
| LCH3 | 128 | 58 | 5.8 | 17.8 | 400 | 0.269 | 0.175 |
| BCH1 | 104 | 46 | 5.3 | 18.0 | 440 | 0.290 | 0.195 |
| BCH2 | 137 | 44 | 5.2 | 18.2 | 460 | 0.260 | 0.215 |
| BCH3 | 118 | 42 | 5.1 | 18.3 | 450 | 0.250 | 0.186 |
| BCH4 | 115 | 37 | 4.8 | 17.9 | 450 | 0.255 | 0.213 |
| BCH5 | 151 | 51 | 6.2 | 18.5 | 480 | 0.356 | 0.185 |

An examination of the data of Table 3, if compared with those relating to analogous non-hydrogenated polymers, shows that the hydrogenation reaction causes an increase in the Mooney viscosity in all the polymers, regardless of their initial composition.

Together with an increase in the Mooney viscosity, there is also a moderate increase in the $M_w/M_n$ polydispersion index value. The $T_g$ values remain substantially centred on values very close to those measured for the non-hydrogenated polymers. Furthermore DSC analysis does not reveal melting heat Comments on Table 4
Compound Based on Parent Polymer Linear polymers with a not too broad molecular weight distribution (LC1, LC2, LC3) cause a rapid wetting phase in the incorporation phase of the filler, but a less efficient dispersion of the same due to an insufficient shear action on the aggregates of the particles. A direct consequence of this is the generally high ΔMooney value which, as already specified, represents a measurement of the efficiency with which the filler has been dispersed; the lower dispersion of the filler causes a deterioration in the characteristics of the vulcanized product, in particular a lower ultimate tensile strength and also in the dynamic properties; the tan δ values associated with the measurement of the rolling resistance do in fact reveal characteristics typical of a hysteretic blend (LC1 and LC2); in the case of LC3, the lower Tg value creates a good rolling resistance value associated however with an unacceptable wet grip value.

The introduction of branchings (BC1, BC2, BC3) improves the behavior in the dispersion phase of the filler as shown by the ΔMooney values; higher values are consequently observed with respect to the ultimate tensile strength and, from a dynamic point of view, an improvement in the tan δ associated with the measurement of the rolling resistance. The improved elastic characteristics of the material are reflected on the tan δ value associated with the grip measurement which undergo a shift in a direction which deteriorates these characteristics. Analogously with the corresponding linear polymers having identical compositions (BC1 vs LC1 and BC2 vs LC2) the higher styrene content causes, with the same Tg, an increase in the hysteretic characteristics of the material. The different rolling resistance and wet grip values measured on the polymer BC3 can be attributed to the lower glass transition temperature which, as in the case of the linear polymer having an identical composition (LC3), causes a shift in the properties towards a more elastic behavior; this has a beneficial effect on the rolling resistance, but with grip characteristics which are still insufficient.

To summarize, in the case of non-hydrogenated polymers, a general improvement in the elastic characteristics is observed, due to the better dispersion of the filler in the passage from linear polymer to branched polymers; the Tg value centred on −20° C. represents a compromise value for obtaining materials for which sufficiently good rolling resistance values are accompanied by sufficiently good wet grip values. If the above Tg value is reached by increasing the styrene content to the detriment of the vinyl unit (compare BC2 and LC2), the hysteretic characteristics are privileged with respect to the polymers in which the Tg value centred on −20° C. is reached with vinyl unit contents >60% (compare polymers LC1 and BC1). The polymer with a low Tg both in linear and modified variants (LC3 and BC3) shows, as already specified, excellent low rolling resistance properties, but completely unsatisfactory road grip properties.

Compound Based on Hydrogenated Polymer

The partial hydrogenation of SSBR with a different composition, microstructure and macrostructure causes (in addition to an observed increase in the Mooney viscosity), a general improvement in the mechanical properties of the polymeric matrix, this improvement being transferred to the properties of the blend.

The increase in the Mooney viscosity of the partially hydrogenated polymer does not favor the wetting phase; to demonstrate this a comparison should be made of the higher ΔMooney values of the hydrogenated linear polymers (LCH1, LCH2, LCH3) with the analogous hydrogenated branched polymers (BCH1, BCH2, BCH3). The poorer dispersion causes lower values of the mechanical characteristics of the hydrogenated linear products (LCH1, LCH2, LCH3) with respect to the corresponding hydrogenated branched polymers (BCH1, BCH2, BCH3); in all cases these values are better than the corresponding values of the non-hydrogenated linear series (LCH1, LCH2, LCH3) and non-hydrogenated branched polymers (BCH1, BCH2, BCH3). The complicated wetting phase is probably the cause of the high tan δ values associated with the rolling resistance for the linear polymers LCH1, LCH2; also in this case, due to the low Tg of the polymer, the rolling resistance values of LCH3 are extremely good (even if lower than the branched reference having the same composition BCH3, but they are associated with the tan δ values corresponding to an insufficient grip. The introduction of branchings which greatly improve the processability of the material allow excellent rolling resistance values to be obtained, associated however with equally good wet grip values as shown by the tan δ values at 0° C. and 0.1 Hz with a deformation equal to 0.1% when the composition and the microstructure identify a Tg centred at −20° C. (BCH1 and BCH2); when the Tg is lower, the good rolling resistance values do not correspond to equally good hysteresis values. The elastomer with a composition having a styrene content equal to 40.5% (BCH2) shows, with the same Tg, better grip values than the corresponding BCH1 due to the greater quantity of styrene.

Modification of the hydrogenation degree causes a modest variation in the properties of the rubber if this modification is effected within the range of 30 to 80% with reference only to the diene part of the copolymer.

The behavior of the two reference polymers BCH4 and BCH5 demonstrates what is indicated above.

In BCH4 a hydrogenation degree (GI=44%) with respect to BCH2 causes a modest variation in the mechanical characteristics and dynamic characteristics of the blend with the polydiene; the latter show a slight deterioration in the gripping capacity on a slippery surface, but are compensated by a further slight improvement in the rolling resistance.

An excessive saturation with hydrogen of the double bonds (BCH5, GI=89.9), on the contrary, causes a distinct deterioration in the mechanical characteristics (high modulus at 200%) together with unusually high rolling resistance values suggesting a possible overvulcanization of the polydiene phase.

To summarize, it has been found that for applications in which an optimum balance is required between the rolling resistance and grip properties on a wet surface or in the presence of ice, a composition containing a polydiene with a high content of 1,4 cis units and branched SSBR containing 40% of styrene and a Tg centred at −20° C. (with a hydrogenation degree ranging from 80 to 30% relating to the diene part) has the best characteristics.

The invention claimed is:

1. A raw elastomeric composition comprising (a1), (a2), (b), (c) and (d) where
   (a1) is from 30 to 90% by weight of a partially hydrogenated vinylarene conjugated diene random elastomeric copolymer;
   (a2) is from 10 to 70% by weight of one or more diene rubbers;
   (b) is from 10 to 150 phr of silica;
   (c) is from 0.1 to 20 phr of a silane coupling agent;
   (d) is from 0.1 to 10 phr of a vulcanization agent;
wherein (a1) and (a2) are elastomers and the total percentage by weight of the elastomers (a1) and (a2) in the composition is equal to about 100%; and the partially hydrogenated vinylarene conjugated diene random copolymer has a macromolecular structure with nodes that are statistically distributed along the macromolecular structure and from which polymeric chains branch off, and the bond between the nodes and the polymeric chain said branches is a carbon-carbon bond.

2. The raw elastomeric composition of claim 1, wherein the vinylarene is styrene and the conjugated diene is 1,3-butadiene.

3. The raw elastomeric composition of claim 1, wherein the vinylarene conjugated diene random elastomeric copolymer has a hydrogenation degree of the double bonds in of the diene portion ranging from 20 to 89%.

4. The raw elastomeric composition of claim 1, wherein the partially hydrogenated vinylarene conjugated diene random elastomeric copolymer has a vinylarene content of from 15 to 50% by weight, a weight average molecular weight ($M_w$) of from 50,000 to 1,000,000, a molecular weight distribution ($M_w/M_n$) of from 1 to 5, a Mooney viscosity $ML_{1+4}$ at 100° C. of from 30 to 200, a Tg of from −100° C. to 0° C. and a vinyl content before hydrogenation of from 10 to 80%.

5. The raw elastomeric composition of claim 4, wherein the partially hydrogenated vinylarene conjugated diene random elastomeric copolymer has a vinylarene content of from 20 to 45% by weight, a weight average molecular weight ($M_w$) of from 300,000 to 800,000, a molecular weight distribution ($M_w/M_n$) of from 1 to 3, a Mooney viscosity $ML_{1+4}$ at 100° C. of from 50 to 150, a Tg of from −80° C. to 0° C. and a vinyl content before hydrogenation of ranging from 20 to 70%.

6. The raw elastomeric composition of claim 1, wherein the coupling agent is a functionalized trialkoxysilane or a dialkoxysilane.

7. The raw elastomeric composition of claim 1, wherein the vulcanizing agent is selected from one or more compounds containing sulphur.

8. The raw elastomeric composition of claim 1, comprising a quantity of carbon black of from 10 to 150 phr.

9. The raw elastomeric composition of claim 1, wherein the elastomer (a1) has an alpha (α) value lower than 0.58.

10. The raw elastomeric composition of claim 2, wherein the vinylarene conjugated diene random elastomeric copolymer has a hydrogenation degree of the double bonds in the diene portion ranging from 20 to 89%.

11. The raw elastomeric composition of claim 2, wherein the partially hydrogenated vinylarene conjugated diene random elastomeric copolymer has a vinylarene content of from 15 to 50% by weight, a weight average molecular weight ($M_w$) of from 50,000 to 1,000,000, a molecular weight distribution ($M_w/M_n$) of from 1 to 5, a Mooney viscosity $ML_{1+4}$ at 100° C. of from 30 to 200, a Tg of from −100° C. to 0° C. and a vinyl content before hydrogenation of from 10 to 80%.

12. The raw elastomeric composition of claim 3, wherein the partially hydrogenated vinylarene conjugated diene random elastomeric copolymer has a vinylarene content of from 15 to 50% by weight, a weight average molecular weight ($M_w$) of from 50,000 to 1,000,000, a molecular weight distribution ($M_w/M_n$) of from 1 to 5, a Mooney viscosity $ML_{1+4}$ at 100° C. of from 30 to 200, a Tg of from −100° C. to 0° C. and a vinyl content before hydrogenation of from 10 to 80%.

13. The raw elastomeric composition of claim 10, wherein the partially hydrogenated vinylarene conjugated diene random elastomeric copolymer has a vinylarene content of from 15 to 50% by weight, a weight average molecular weight ($M_w$) of from 50,000 to 1,000,000, a molecular weight distribution ($M_w/M_n$) of from 1 to 5, a Mooney viscosity $ML_{1+4}$ at 100° C. of from 30 to 200, a Tg of from −100° C. to 0° C. and a vinyl content before hydrogenation of from 10 to 80%.

14. The raw elastomeric composition of claim 11, wherein the partially hydrogenated vinylarene conjugated diene random elastomeric copolymer has a vinylarene content of from 20 to 45% by weight, a weight average molecular weight ($M_w$) of from 300,000 to 800,000, a molecular weight distribution ($M_w/M_n$) of from 1 to 3, a Mooney viscosity $ML_{1+4}$ at 100° C. of from 50 to 150, a Tg of from −80° C. to 0° C. and a vinyl content before hydrogenation of from 20 to 70%.

15. The raw elastomeric composition of claim 12, wherein the partially hydrogenated vinylarene conjugated diene random elastomeric copolymer has a vinylarene content of from 20 to 45% by weight, a weight average molecular weight ($M_w$) of from 300,000 to 800,000, a molecular weight distribution ($M_w/M_n$) of from 1 to 3, a Mooney viscosity $ML_{1+4}$ at 100° C. of from 50 to 150, a Tg of from −80° C. to 0° C. and a vinyl content before hydrogenation of from 20 to 70%.

16. The raw elastomeric composition of claim 13, wherein the partially hydrogenated vinylarene conjugated diene random elastomeric copolymer has a vinylarene content of from 20 to 45% by weight, a weight average molecular weight ($M_w$) of from 300,000 to 800,000, a molecular weight distribution ($M_w/M_n$) of from 1 to 3, a Mooney viscosity $ML_{1+4}$ at 100° C. of from 50 to 150, a Tg of from −80° C. to 0° C. and a vinyl content before hydrogenation of from 20 to 70%.

17. Tire treads obtained by the vulcanization of the raw elastomeric composition of claim 1.

* * * * *